Figure 1:
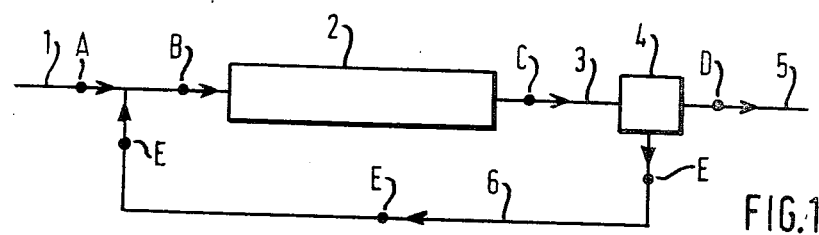

United States Patent [19]

Tennison

[11] 4,271,136
[45] Jun. 2, 1981

[54] PROCESS FOR THE PRODUCTION OF AMMONIA

[75] Inventor: Stephen R. Tennison, Weybridge, England

[73] Assignee: The British Petroleum Company Limited, London, England

[21] Appl. No.: 81,131

[22] Filed: Oct. 2, 1979

[30] Foreign Application Priority Data

Oct. 12, 1978 [GB] United Kingdom ............... 40384/78

[51] Int. Cl.³ ............................................. C01C 1/04
[52] U.S. Cl. .................................... 423/362; 423/363
[58] Field of Search ............... 423/359, 360, 361, 362, 423/363

[56] References Cited

U.S. PATENT DOCUMENTS 4,163,775  8/1979  Foster et al. .......................... 423/363

Primary Examiner—O. R. Vertiz
Assistant Examiner—Wayne A. Langel
Attorney, Agent, or Firm—Morgan, Finnegan, Pine, Foley & Lee

[57] ABSTRACT

A process for the production of ammonia comprises passing hydrogen and nitrogen over a catalyst comprising a transition metal, e.g. ruthenium, and a modifying metal, e.g. an alkali metal, supported on a graphite-containing carbon support having specified surface area properties. At start-up the nitrogen is supplied in stoichiometric excess and thereafter in stoichiometric proportions.

11 Claims, 4 Drawing Figures

PROCESS FOR THE PRODUCTION OF AMMONIA

This invention relates to a process for the production of ammonia.

With increased pressure on the world's food resources the demand for nitrogen containing fertilisers based on ammonia has grown rapidly in recent years. Current Haber processes using nitrogen and hydrogen as feedstocks generally use a potassium promoted iron catalyst, usually with other promoters such as alumina. These catalysts are reduced in situ from bulk iron oxides before use and operate under severe conditions, e.g., pressures of up to 300 bars and temperatures of 450°-500° C.

The reaction $N_2 + 3H_2 \rightleftharpoons 2NH_3$ is highly exothermic and thus the equilibrium is moved to the right at lower temperatures. However, present day commercial catalysts are not sufficiently active at lower temperatures to enable the reaction to reach equilibrium within the short time the reactants are in contact with the catalyst. Activity increases with temperature and therefore a compromise has to be reached.

Recent work by Aika et al, Journal of Catalysis, 27, 424-431 (1972), on the synthesis of ammonia discloses that synthesis over a ruthenium catalyst is promoted by the addition of an alkali metal, particularly when the ruthenium is supported by active carbon or alumina.

Similarly, British Patent Specification No. 1367112 to Sagami Chemical Research Centre discloses a complex catalyst for ammonia synthesis which comprises (a) at least one alkali metal belonging to Group 1A of the Periodic Table, (b) at least one compound, preferably a halide, oxide or sulphide, of a transition metal selected from the group consisting of Group 4B, Group 5B, Group 6B, Group 7B and Group 8 of the Periodic table and graphite. The Periodic Table referred to by Sagami is that given in the "Handbook of Chemistry", edited by Norbert Adolf Lange; McGraw-Hill, 1961; pages 56 to 57.

The complex comprises an alkali metal as the electron donor, graphite as the electron acceptor and a transition metal compound. The alkali metal and the transition metal compound are present as intercalates in the graphite lattice. Aika and Sagami both disclose the use of free alkali metal or precursors thereof, such as azides, as electron donors.

Our copending British Patent Application Ser. No. 45711/76 discloses a catalyst comprising (i) as support a graphite-containing carbon having (a) a basal plane surface area of at least 100 $m^2/g$, (b) a ratio of BET surface area to basal plane surface area of not more than 8:1, preferably not more than 5:1 and (c) a ratio of basal plane surface area to edge surface area of at least 2:1 and preferably at least 5:1 and (ii) as active component (a) 0.1 to 50%. preferably 1-30%, most preferably 5-10% by weight of a transition metal of the 4th, 5th and 6th horizontal Periods of Groups VB, VIB, VIIB and VIII of the Periodic Table expressed as % by weight of total catalyst and (b) 0.1 to 4 times by weight of (a) of a modifying metal ion selected from Groups IA or IIA of the Periodic Table or the lanthanides or actinides, the modifying metal ion being actively associated with the transition metal rather than the support.

Unless otherwise indicated the Periodic Table referred to in the present specification is the Periodic Table published on page B-4 of the Handbook of Chemistry and Physics, 57th Edition, 1976-1977, published by CRC Press, Cleveland, Ohio.

Such a catalyst is suitable for the production of ammonia from hydrogen and nitrogen.

It is distinguished from the prior art in that it is neither an electron donor-acceptor complex nor is it an intercalate compound.

It has now been discovered that operating the process with the above catalyst and utilising an excess of nitrogen over the stoichiometric requirements for conversion increases the activity of the catalyst and furthermore that this increased activity is sustained at high feedstock space velocities. Only an initial excess is necessary. Thereafter the feed is supplied in stoichiometric proportions.

Thus according to the present invention there is provided a continuous process for the production of ammonia which process comprises passing a feedstock containing hydrogen and nitrogen, at start-up the nitrogen being supplied in stoichiometric excess and thereafter in stoichiometric proportions, over a catalyst comprising (i) as support a graphite-containing carbon having (a) a basal plane surface area of at least 100 $m^2/g$, (b) a ratio of BET surface area to basal plane surface area of not more than 8:1, preferably not more than 5:1, and (c) a ratio of basal plane surface area to edge surface area of at least 2:1 and preferably, at least 5:1, and (ii) as active component (a) 0.1 to 50% preferably 1-30%, most preferably 5-10% by weight of a transition metal of the 4th, 5th and 6th horizontal Periods of Groups VB, VIB, VIIB and VIII of the Periodic Table, expressed as % by weight of total catalyst, and (b) 0.1 to 4 times by weight of (a) of a modifying metal ion selected from Groups 1A or IIA of the Periodic Table or the lanthanides or actinides, the modifying metal ion being actively associated with the transition metal rather than the support, under conditions of temperature, pressure and space velocity such that conversion to ammonia is effected, separating unreacted hydrogen and nitrogen from product ammonia, recycling the unreacted hydrogen and nitrogen with the nitrogen in stoichiometric excess, and supplying make-up feedstock of hydrogen and nitrogen in stoichiometric proportions.

The preferred transition metals are cobalt, ruthenium and rhodium. Ruthenium is the most preferred.

Preferred components (b) are the alkali and alkaline earth metal ions. The most preferred are rubidium and potassium.

The graphite-containing carbon may be prepared by the method disclosed in British Patent Specification No. 1468441 comprising the steps of (1) an initial heat treatment in an inert atmosphere at a temperature between 900° and 3300° C., (2) an oxidation stage at a temperature between 300° and 1200° C., and (3) a further heat treatment in an inert atmosphere at a temperature between 1000° and 3000° C., preferably between 1400° and 2100° C.

Broad and preferred ranges of process conditions are as follows:

| | Broad Range | Preferred Range |
|---|---|---|
| Temperature °C. | 250-600 | 300-500 |
| Pressure bars | Atmospheric-300 | 20-200 |
| Space velocity v/v/hr | 1,000-100,000 | 5,000-30,000 |

Preferably the initial molar ratio of hydrogen to nitrogen is in the ratio 2 to 1 to 0.67 to 1, most preferably about 1:1, for moderate space velocities.

At high space velocities, e.g., in the range 30,000 to 100,000, even lower initial ratios of hydrogen to nitrogen may be beneficial, e.g., about 0.5:1.

However, as the hydrogen content of the feed drops the maximum conversion to ammonia also decreases. This is because at a given temperature and pressure the maximum percentage of ammonia in the gas cannot exceed the equilibrium concentration and this decreases with the hydrogen content of the gas. As the conversion to ammonia increases, the hydrogen content of the gas drops to the point where equilibrium constraints become too severe in the case of systems with low initial hydrogen contents.

This problem becomes more significant as the initial hydrogen concentration decreases and can be overcome by injecting hydrogen at an intermediate point or points along the reactor.

In a conventional process operating under stoichiometric conditions, a feedstock comprising hydrogen and nitrogen in the molar ratio of 3:1 is passed to a reactor where partial conversion occurs. The product, ammonia, is removed, and unreacted hydrogen and nitrogen are recycled. Since the feedstock is supplied with a $H_2/N_2$ molar ratio of 3:1 and the product removed has the same molar ratio, the recycle must also contain the same gases in the same ratio and therefore the gas composition at all points in the system has this ratio, i.e., initial feed, feed to reactor, conversion occurs. The product, ammonia, is removed, and unreacted hydrogen and nitrogen are recycled. Since the feedstock is supplied with a $H_2/N_2$ molar ratio of 3:1 and the product removed has the same molar ratio, the recycle must also contain the same gases in the same ratio and therefore the gas composition at all points in the system has this ratio, i.e., initial feed, feed to reactor, product and recycle loop. This is shown diagrammatically in the attached FIG. 1.

In a process according to the present invention the system is quite different at start-up. Then an initial feedstock comprising hydrogen and nitrogen with a stoichiometric excess of nitrogen is passed to a reactor where partial conversion occurs. The product, ammonia, is removed and unreacted hydrogen and nitrogen are recycled. Since the feedstock is supplied with a stoichiometric excess of nitrogen and the product is removed in stoichiometric proportions, the recycle therefore contains a stoichiometric excess of nitrogen which provides the stoichiometric excess in the reactor and permits feedstock to be supplied in stoichiometric proportions after the initial period. The gas composition therefore differs at different points in the system. This is shown diagrammatically in the attached FIG. 2.

Synthesis gas is a suitable source of hydrogen and the atmosphere of nitrogen.

It is not, however, necessary to use highly pure nitrogen and hydrogen in a process according to the present invention since the catalyst has a high tolerance of poisons which are normally harmful to conventional catalysts, such as water and carbon monoxide.

If impurities are present, such as inert gases in nitrogen derived from the atmosphere, these will tend to concentrate in the system unless steps are taken to remove them.

Preferably to achieve this a purge stream is withdrawn from the recycle stream. If this is done, however, the quantity of hydrogen and nitrogen recycled will be altered and therefore the molar ratio of total feedstock to the reactor (i.e., recycle and make-up feed) will also be altered. To compensate for this, a make-up stream to re-establish the desired ratio should be supplied to the reactor. This is shown diagrammatically in the attached FIG. 3.

With reference to FIG. 1.

Feedstock enters the system through line 1 and is mixed with unreacted nitrogen and hydrogen before entering a reactor 2. Product and unreacted feedstock leave by line 3 and pass to a separator 4 from which ammonia product is withdrawn by line 5 and unreacted nitrogen and hydrogen are recycled by line 6.

Typical throughput ratios at various points are given below:

| Point | Composition | |
|---|---|---|
| A | 2 mol | 1.5 mol $H_2$ / 0.5 mol $N_2$ |
| B | 6 mol | 4.5 mol $H_2$ / 1.5 mol $N_2$ |
| C | 5 mol | 1 mol $NH_3$ / 3 mol $H_2$ / 1 mol $N_2$ |
| D | 1 mol | $NH_3$ |
| E | 4 mol | 3 mol $H_2$ / 1 mol $N_2$ |

The molar ratio of $H_2:N_2$ at all points is 3:1.

Figure 2:
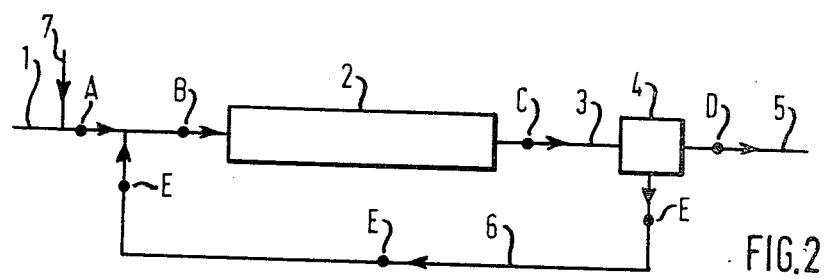

With reference to FIG. 2.

The system of FIG. 2 is similar to that of FIG. 1 with the addition of a feed line 7 for supplying additional nitrogen at start-up.

Typical throughput ratios at various points are given below:

| Point | Composition | |
|---|---|---|
| A Initially | 6 mol | 3 mol $H_2$ / 3 mol $N_2$ |
| A Subsequently | 2 mol | 1.5 mol $H_2$ / 0.5 mol $N_2$ |
| B | 6 mol | 3 mol $H_2$ / 3 mol $N_2$ |
| C | 5 mol | 1 mol $NH_3$ / 1.5 mol $H_2$ / 2.5 mol $N_2$ |
| D | 1 mol | $NH_3$ |
| E | 4 mol | 1.5 mol $H_2$ / 2.5 mol $N_2$ |

In this system the ratio of $H_2:N_2$ changes from 1:1 $H_2:N_2$ at the reactor inlet to 1.5:2.5 at the outlet.

Figure 3:
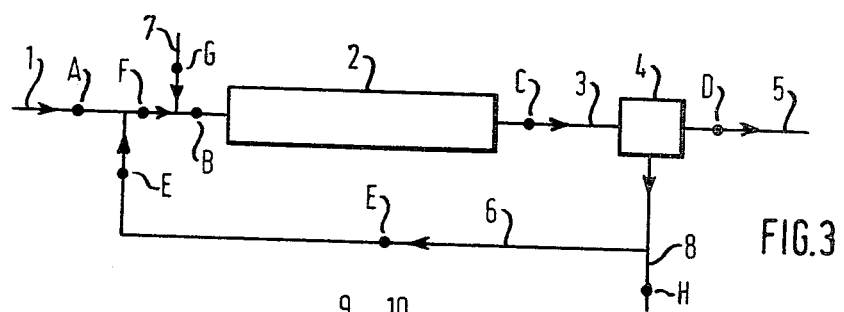

With reference to FIG. 3.

The system of FIG. 3 is similar to that of FIG. 1 with the addition of a purge line 8.

Typical throughput ratios at various points are given below:

| Point | Composition | |
|---|---|---|
| A Initially | 6 mol | 3 mol $H_2$ / 3 mol $N_2$ |

| Point | | Composition |
|---|---|---|
| A Subsequently | 2.1 mol | 1.575 mol $H_2$ / 0.525 mol $N_2$ |
| B | 6 mol | 3 mol $H_2$ / 3 mol $N_2$ |
| C | 5 mol | 1 mol $NH_3$ / 1.5 mol $H_2$ / 2.5 mol $N_2$ |
| D | 1 mol | $NH_3$ |
| E | 3.8 mol | 1.425 mol $H_2$ / 2.375 mol $N_2$ |
| F | 5.9 mol | 3.0 mol $H_2$ / 2.9 mol $N_2$ |
| G | 0.1 mol | $N_2$ |
| H | 0.2 mol | 0.075 mol $H_2$ / 0.125 mol $N_2$ |

In the system according to FIG. 3, because the molar ratio of $H_2:N_2$ is displaced to 1.5:2.5 in the recycle line 6, purging by line 8 results in the removal of a disproportionate volume of nitrogen. This is made up by the continuous injection of extra nitrogen through line 7.

Assuming a purge of 5% of total flow, the gas removed in the purge would contain 0.075 mol $H_2$ and 0.125 mol $N_2$ leaving a recycle gas flow of 1.425 mol $H_2$ and 2.375 mol $N_2$. This in turn would give a gas mixture at the reactor inlet, after addition of feed gas, of 2.925 mol $H_2$ and 2.875 mol $N_2$. To compensate for this it would be necessary to increase the feed to 1.575 mol $H_2$ and 0.525 mol $N_2$ giving a gas ratio of 3.0 mol $H_2$ and 2.9 mol $N_2$ at F. Therefore to retain the 1:1 ratio at the reactor inlet the continuous injection of 0.1 mol $N_2$ would be required.

Reverting to the system described with reference to FIG. 2, the feedstock entering the reactor has the desired molar ratio of $H_2:N_2$ of 1:1. However, since the reaction consumes more hydrogen than nitrogen, the molar ratio of hydrogen to nitrogen will progressively decrease along the length of the reactor. In order to compensate for this, additional hydrogen may be injected at points along the reactor to maintain the desired ratio.

This will affect the composition of the recycle gas and additional adjustments to the composition of the make-up feed may be necessary.

Figure 4:
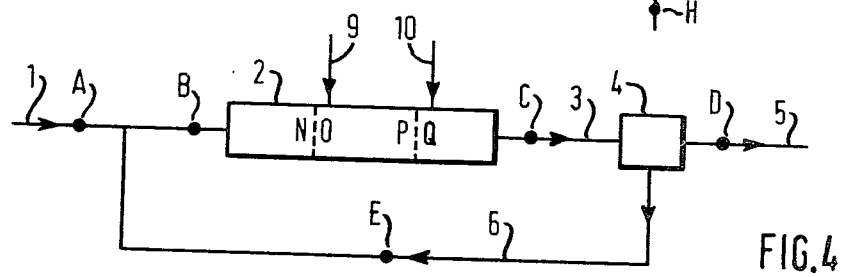

This system is schematically set out in FIG. 4 wherein intermediate hydrogen injection takes place through lines 9 and 10.

Typical throughputs at various points are given below.

| | | |
|---|---|---|
| A | 1.332 mol | 0.4995 mol $N_2$ / 0.8325 mol $H_2$ |
| B | 12 mol | 6 mol $N_2$ / 6 mol $H_2$ |
| C | 11.668 mol | 5.5005 $N_2$ / 5.1675 $H_2$ / 1 mol $NH_3$ |
| D | 1 mol | 1 mol $NH_3$ |
| E | 10.668 mol | 5.5005 $N_2$ / 5.1675 $H_2$ |
| N | 11.667 mol | 5.8335 mol $N_2$ / 5.5005 mol $H_2$ / 0.333 mol $NH_3$ |
| O | 12 mol | 5.8335 mol $N_2$ / 5.8335 mol $H_2$ / 0.333 mol $NH_3$ |
| P | 11.667 mol | 5.667 mol $N_2$ / 5.334 mol $H_2$ / 0.666 mol $NH_3$ |
| Q | 12 mol | 5.667 mol $N_2$ / 5.667 mol $H_2$ / 0.666 mol $NH_3$ |

0.333 mol Hydrogen injected at 9 & 10
Total feed = A + 9 + 10 = 2.0 mol

I claim:

1. A continuous process for the production of ammonia which process includes a start-up stage and a subsequent stage, said process comprising passing a feedstock containing hydrogen and nitrogen over a catalyst during both said start-up stage and said subsequent stage, the nitrogen and hydrogen being supplied at said start-up stage so that nitrogen is in stoichiometric excess and thereafter supplying make up feedstock of nitrogen and hydrogen in stoichiometric proportions, said catalyst comprising (i) as support a graphite-containing carbon having (a) a basal plane surface area of at least 100 m²/g, (b) a ratio of BET surface area to basal plane surface area of not more than 8:1, and (c) a ratio of basal plane surface area to edge surface area of at least 2:1, and (ii) as active component (a) 0.1 to 50% by weight of a transition metal of the 4th, 5th and 6th horizontal periods of Groups VB, VIB, VIIB and VIII of the Periodic Table, expressed as % by weight of total catalyst, and (b) 0.1 to 4 times by weight of (a) of a modifying metal ion selected from Groups IA or IIA of the Periodic Table or the lanthanides or actinides, the modifying metal ion being actively associated with the transition metal rather than the support, under conditions of temperature, pressure and space velocity such that conversion to ammonia is effected, separating unreacted hydrogen and nitrogen from product ammonia, recycling the unreacted hydrogen and nitrogen to said subsequent stage with the nitrogen in stoichiometric excess, and supplying make-up feedstock of hydrogen and nitrogen to said subsequent stage in stoichiometric proportions.

2. A process according to claim 1 wherein the graphite-containing carbon has a ratio of BET surface area to basal plane surface area of not more than 5:1 and a ratio of basal plane surface area to edge surface area of at least 5:1.

3. A process according to claims 1 or 2 wherein the transition metal is present in an amount of 1 to 30% by weight, expressed as % by weight of total catalyst.

4. A process according to claims 1 or 2 wherein the transition metal is ruthenium.

5. A process according to claims 1 or 2 wherein the modifying metal ions are rubidium or potassium ions.

6. A process according to claims 1 or 2 wherein the feedstock is passed over the catalyst at a temperature in the range 250° to 600° C., a pressure in the range atmospheric to 300 bars and a space velocity in the range 1,000 to 100,000 v/v/hr.

7. A process according to claim 6 wherein the feedstock is passed over the catalyst at a temperature in the range 300° to 500° C., a pressure in the range 20 to 200 bars and a space velocity in the range 5,000 to 30,000 v/v/hr.

8. A process according to claims 1 or 2 wherein the molar ratio of hydrogen to nitrogen at the entrance to the reactor is in the range 2:1 to 0.67:1.

9. A process according to claim 8 wherein the molar ratio of hydrogen to nitrogen at the entrance to the reactor is 1:1.

10. A process according to claims 1 or 2 wherein a purge stream is withdrawn from the recycle stream and a compensating make-up stream is supplied to the reactor to re-establish the desired ratio of hydrogen to nitrogen.

11. A process according to claims 1 or 2 wherein hydrogen is injected at an intermediate point or points along the reactor.

* * * * *